United States Patent
Gillett

(10) Patent No.: US 9,227,650 B2
(45) Date of Patent: Jan. 5, 2016

(54) CHILD STROLLER

(71) Applicant: Sharon A. Gillett, Kent, OH (US)

(72) Inventor: Sharon A. Gillett, Kent, OH (US)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 0 days.

(21) Appl. No.: 14/622,935

(22) Filed: Feb. 16, 2015

(65) Prior Publication Data

US 2015/0232114 A1    Aug. 20, 2015

Related U.S. Application Data

(60) Provisional application No. 61/966,272, filed on Feb. 20, 2014.

(51) Int. Cl.
| | |
|---|---|
| *B62B 3/02* | (2006.01) |
| *B62B 7/12* | (2006.01) |
| *B62B 7/06* | (2006.01) |
| *B62B 7/00* | (2006.01) |

(52) U.S. Cl.
CPC . *B62B 7/12* (2013.01); *B62B 7/006* (2013.01); *B62B 7/008* (2013.01); *B62B 7/06* (2013.01)

(58) Field of Classification Search
CPC ............ B62B 7/008; B62B 9/12; B62B 9/28; B62B 7/12; B62B 7/06; B62B 7/006
See application file for complete search history.

(56) References Cited

U.S. PATENT DOCUMENTS

| | | | | |
|---|---|---|---|---|
| 4,542,915 A | * | 9/1985 | Wheeler et al. | 280/642 |
| 4,725,071 A | * | 2/1988 | Shamie | 280/643 |
| D321,850 S | * | 11/1991 | Mong-Hsing | D12/129 |
| 5,338,096 A | * | 8/1994 | Huang | 297/243 |
| 5,417,449 A | * | 5/1995 | Shamie | 280/642 |
| D359,937 S | * | 7/1995 | Yoshie et al. | D12/129 |
| D375,706 S | * | 11/1996 | Haung | D12/129 |
| 5,664,795 A | * | 9/1997 | Haung | 280/47.38 |
| 6,086,087 A | * | 7/2000 | Yang | 280/658 |
| D429,664 S | * | 8/2000 | Gehr | D12/129 |
| D430,076 S | * | 8/2000 | Gehr | D12/129 |
| D431,212 S | * | 9/2000 | Haung | D12/129 |
| 6,267,406 B1 | * | 7/2001 | Huang | 280/647 |
| 6,676,140 B1 | * | 1/2004 | Gondobintoro | 280/33.993 |
| 6,702,316 B2 | * | 3/2004 | Hsia | 280/648 |
| 6,843,498 B2 | * | 1/2005 | Bretschger et al. | 280/642 |
| 6,877,761 B2 | * | 4/2005 | Hsia | 280/642 |
| 7,451,999 B1 | * | 11/2008 | Liu | 280/642 |
| 7,699,325 B2 | * | 4/2010 | Durbin | 280/47.11 |
| D636,300 S | * | 4/2011 | Greger et al. | D12/133 |
| 7,971,884 B2 | * | 7/2011 | Lundh | 280/32.7 |
| 8,070,180 B2 | * | 12/2011 | Stiba | 280/648 |
| 8,146,926 B2 | * | 4/2012 | Durbin | 280/47.11 |
| 8,157,273 B2 | * | 4/2012 | Bar-Lev | 280/47.39 |
| 8,205,894 B2 | * | 6/2012 | Li | 280/47.38 |
| 8,282,109 B1 | * | 10/2012 | Arjomand et al. | 280/37 |
| 8,322,745 B2 | * | 12/2012 | Li et al. | 280/642 |

(Continued)

*Primary Examiner* — Hau Phan
*Assistant Examiner* — Jacob Meyer
(74) *Attorney, Agent, or Firm* — Winston Hsu; Scott Margo

(57) ABSTRACT

A child stroller that can grow with the family starts as a single stroller when a second base and standing boards are fully folded toward a first base. The second base can be slid open with respect to the first base to create a space to attach a full-sized second child seat via a second coupling unit. The standing boards may be extended out from the first base at the back that can be used for one foot or both feet, so that a third child can stand on the standing boards. Multiple configurations are provided for the child stroller.

11 Claims, 9 Drawing Sheets

(56) References Cited

U.S. PATENT DOCUMENTS

| | | | | |
|---|---|---|---|---|
| 8,398,143 | B1* | 3/2013 | Haley | 296/65.06 |
| 8,444,171 | B2* | 5/2013 | Smith et al. | 280/649 |
| 8,480,115 | B2* | 7/2013 | Chen et al. | 280/643 |
| 8,684,395 | B2* | 4/2014 | Winterhalter et al. | 280/647 |
| 8,714,582 | B2* | 5/2014 | Hei et al. | 280/656 |
| 8,757,646 | B2* | 6/2014 | Coleraine et al. | 280/47.4 |
| 8,807,588 | B2* | 8/2014 | Thomas et al. | 280/650 |
| 8,844,964 | B2* | 9/2014 | Chiang | 280/658 |
| 8,857,829 | B2* | 10/2014 | Cheng et al. | 280/47.38 |
| 8,905,427 | B2* | 12/2014 | Katz et al. | 280/648 |
| 8,915,516 | B2* | 12/2014 | Yang et al. | 280/642 |
| 2003/0020259 | A1* | 1/2003 | Tai et al. | 280/647 |
| 2004/0094935 | A1* | 5/2004 | Fair et al. | 280/642 |
| 2006/0226635 | A1* | 10/2006 | Huang | 280/642 |
| 2006/0290107 | A1* | 12/2006 | Powers | 280/658 |
| 2007/0075525 | A1* | 4/2007 | Nolan et al. | 280/642 |
| 2007/0085303 | A1* | 4/2007 | Cheng | 280/642 |
| 2007/0114738 | A1* | 5/2007 | Jones et al. | 280/32.7 |
| 2007/0267833 | A1* | 11/2007 | Durbin | 280/47.38 |
| 2008/0001370 | A1* | 1/2008 | Cousin | 280/32.7 |
| 2008/0179863 | A1* | 7/2008 | Schonfeld | 280/642 |
| 2008/0224432 | A1* | 9/2008 | Lundh | 280/47.38 |
| 2009/0039620 | A1* | 2/2009 | Ryan et al. | 280/647 |
| 2009/0236826 | A1* | 9/2009 | Queen | 280/650 |
| 2009/0302578 | A1* | 12/2009 | White et al. | 280/642 |
| 2010/0038886 | A1* | 2/2010 | Greger et al. | 280/642 |
| 2010/0038887 | A1* | 2/2010 | Bar-Lev | 280/658 |
| 2010/0072731 | A1* | 3/2010 | Thompson | 280/642 |
| 2010/0140902 | A1* | 6/2010 | Zehfuss | 280/650 |
| 2010/0201089 | A1* | 8/2010 | Durbin | 280/47.11 |
| 2010/0282800 | A1* | 11/2010 | Li et al. | 224/409 |
| 2010/0301585 | A1* | 12/2010 | Katz et al. | 280/456.1 |
| 2011/0175330 | A1* | 7/2011 | Smith et al. | 280/649 |
| 2012/0098219 | A1* | 4/2012 | Haut et al. | 280/47.38 |
| 2012/0098237 | A1* | 4/2012 | Winterhalter et al. | 280/647 |
| 2012/0169021 | A1* | 7/2012 | Santamaria | 280/47.35 |
| 2013/0049331 | A1* | 2/2013 | Di Carimate et al. | 280/650 |
| 2013/0234419 | A1* | 9/2013 | Yang et al. | 280/650 |
| 2013/0264787 | A1* | 10/2013 | Cheng et al. | 280/47.38 |
| 2013/0270800 | A1* | 10/2013 | Chiang | 280/658 |
| 2014/0159346 | A1* | 6/2014 | Laffan et al. | 280/650 |
| 2014/0312586 | A1* | 10/2014 | Cheng et al. | 280/47.35 |
| 2014/0346756 | A1* | 11/2014 | Laffan et al. | 280/648 |

* cited by examiner

CHILD STROLLER

CROSS REFERENCE TO RELATED APPLICATIONS

This application claims the benefits of U.S. Provisional Application No. 61/966,272, which was filed on Feb. 20, 2014 and is incorporated herein by reference.

BACKGROUND OF THE INVENTION

1. Field of the Invention

The invention relates to a child apparatus, and more particularly, to a child stroller with slide out expandable child accommodation.

2. Description of the Prior Art

For families with more than one toddler, infant, or young child, it is always challenging to take all the children out without a suitable stroller. Dual strollers on the market are mostly used for families with two children, which can be primarily categorized into several types. For one type, a second seat is attached at the lower rear side of a full-sized main seat, where the second child is uncomfortably squeezed into a cramped space of the second seat. Another typical type of strollers configures two full-sized face-to-face child seats, built on an enlarged main frame and always being a dual stroller. Still another type of strollers configures the two seats side by side and from time to time does not fit through openings such as doors.

All these types of strollers lack flexibility for various situations and an adjustable multi-use child stroller is needed for these inconveniences.

SUMMARY OF THE INVENTION

To solve the above mentioned problem, a child stroller with slide out expandable child accommodation is provided by the embodiments of the invention.

According to an embodiment of the invention, a child stroller includes a first base, a second base, a first seat, and a second seat. The first base includes a first frame and a first wheel set. The second base is slidably assembled with the first base. The second base is extendable to an extended position relative to the first base and is retractable to a retracted position relative to the first base. The second base includes a second wheel set. The first seat is detachably mounted on the first frame for supporting a child. The second seat is detachably mounted on the second base for supporting another child when the second base is configured at the extended position relative to the first base. The first wheel set cooperates with the second wheel set and the child stroller is pushed around via both the first wheel set and the second wheel set.

According to the embodiment, the child stroller further includes a standing board set slidably assembled with the first base along a direction opposite to the second base. The standing board set is retractable to a folded position relative to the first base and is extendable to a rear use position relative to the first base. The standing board set supports still another child when configured at the rear use position.

According to the embodiment, the standing board set includes two standing boards separately slidably assembled with the first base.

According to the embodiment, the second base and the standing board set are horizontally slidable with respect to the first base.

According to the embodiment, the child stroller further includes a handle pivoted to the first frame and configurable between a straight position and a pivoted position.

According to the embodiment, the handle provides a loop around still another child standing on a standing board set when the handle is configured at the second position.

According to the embodiment, the first frame includes a first coupling unit for coupling with the first seat and the second base includes a second coupling unit for coupling with the second seat.

According to the embodiment, the second coupling unit is rotatable with respect to the first base to a folded position when the second base is configured to the retracted position.

According to the embodiment, the first seat and the second seat are ones of the child seats, infant carriers, and bassinets.

The child stroller can grow with the family that has the capability of multiple configurations. The child stroller is compact in size when carrying only one child and fully functional to carry three children when both the second base and the standing boards are slid out from the first base, so that the child stroller functions with full flexibility and portability.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion. Also, the term "couple" is intended to mean either an indirect or direct mechanical connection. Thus, if a first device is coupled to a second device, that connection may be through a direct mechanical connection, or through an indirect mechanical connection via other devices and connections.

The invention provides a child stroller that starts as a single stroller and can be slid open to create a space to attach a second child seat.

Figure 1:
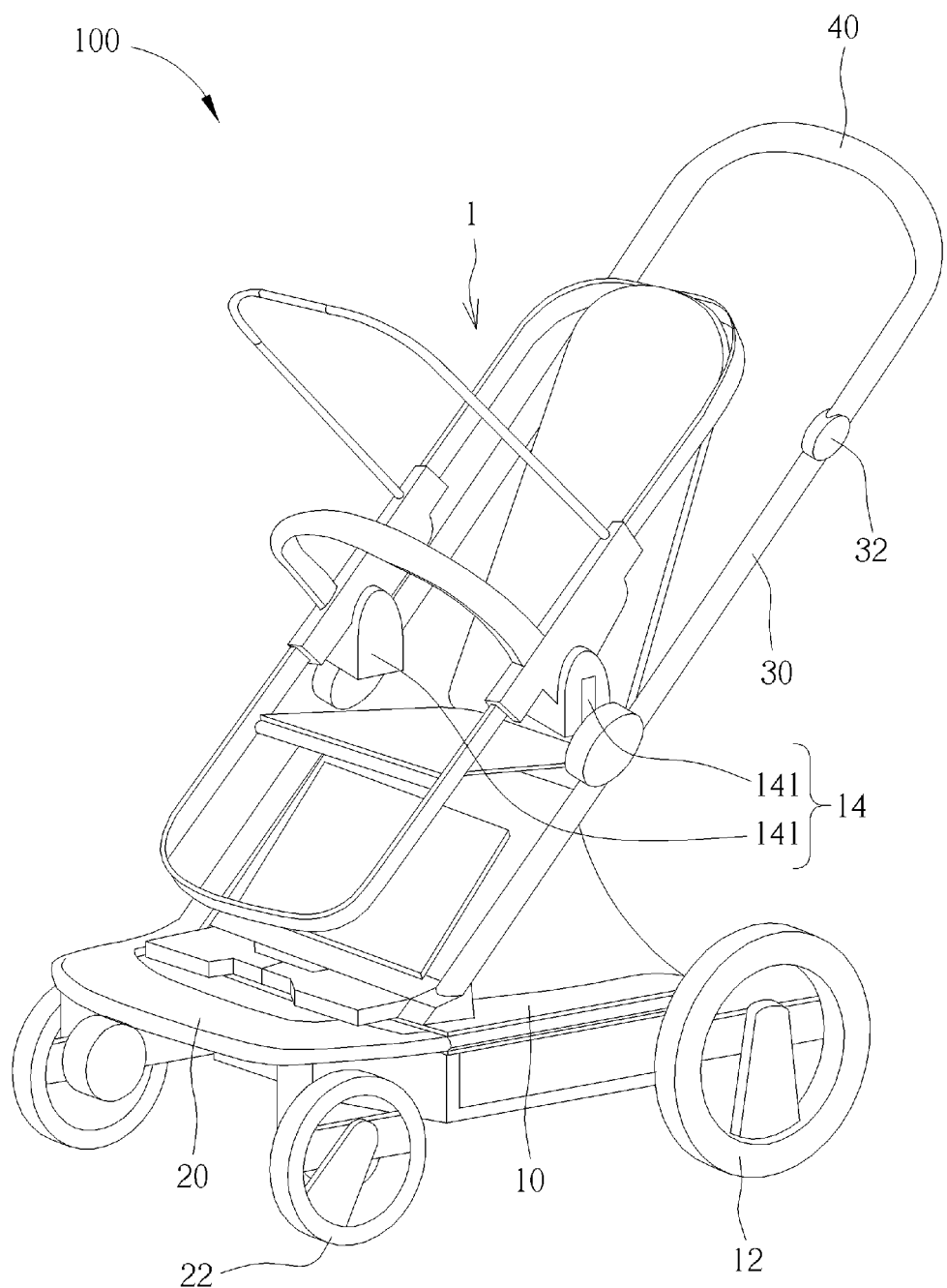
FIG. 1 is a schematic diagram showing a perspective view of a child stroller in one using status according to an embodiment of the invention.
Figure 2:
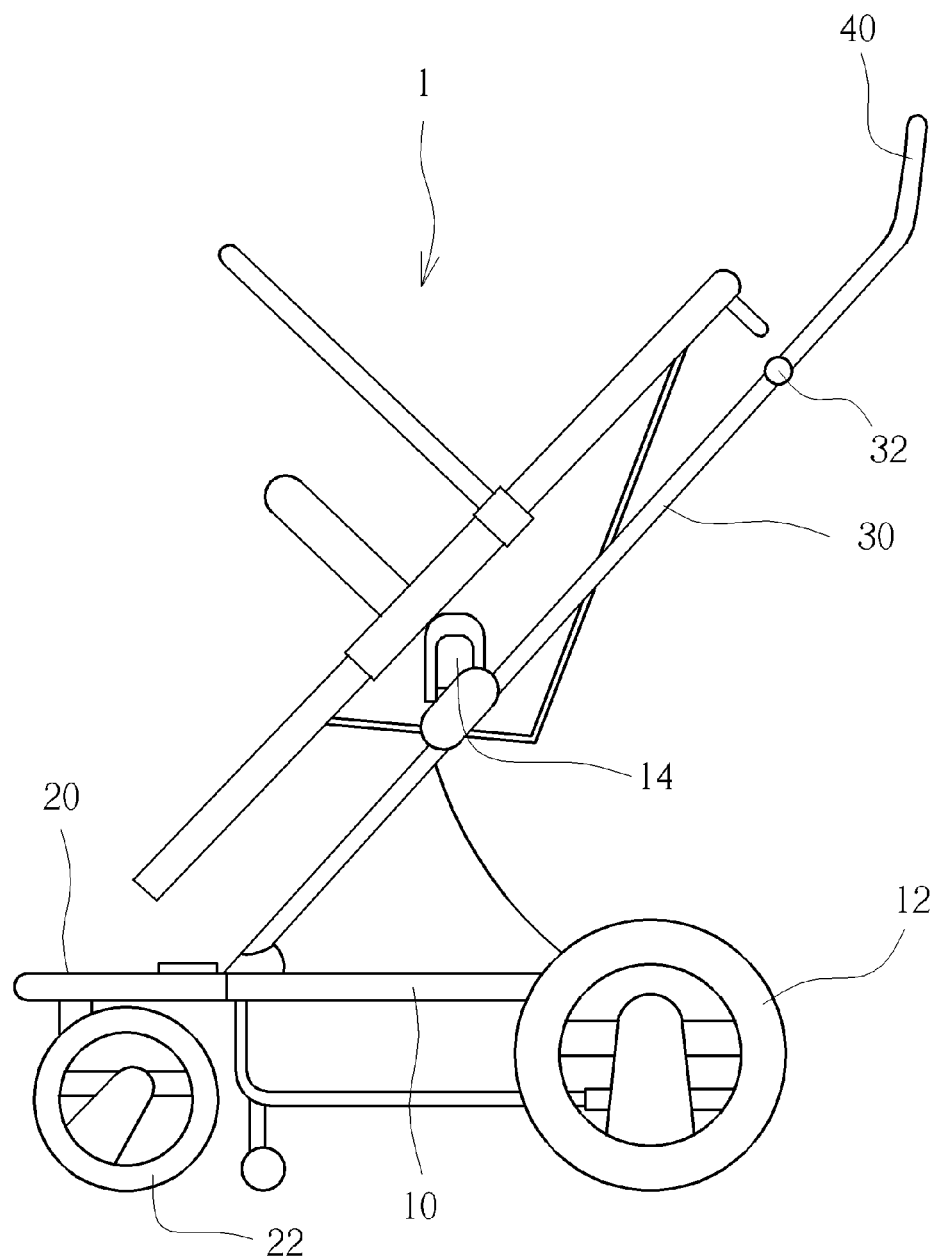
FIG. 2 is a schematic diagram of a side view of the child stroller in FIG. 1.

Please refer to FIG. 1 and FIG. 2. FIG. 1 is a schematic diagram showing a perspective view of a child stroller in one using status according to an embodiment of the invention and FIG. 2 is a schematic diagram of a side view of the child stroller in FIG. 1. Please be noted that some details of the child stroller that can be seen in the perspective view are left out in the side view for illustrative clarity, and this applies on all the side views in the following figures. A child stroller 100 according to the invention includes a first base 10 and a second base 20 slidably assembled with each other. The first base 10 includes a first frame 30, providing support for a first seat 1. The first seat 1 can be detachably assembled with the first frame 30. More specifically, the first frame 30 offers a first coupling unit 14 for coupling with the first seat 1. In one embodiment as shown in FIG. 1, the first coupling unit 14 includes two first coupling components 141 at both sides of the first frame 30 respectively, so as to support the first seat 1 from two sides. The first base 10 also includes a first wheel set 12 and the second base 20 includes a second wheel set 22. The first wheel set 12 and the second wheel set 22 cooperate with each other so that the child stroller 100 may be pushed around and the wheel sets 12, 22 support the child stroller 100 on the ground. The child stroller 100 further includes a handle 40 pivoted at a pivot 32 to the first frame 30.

Figure 3:
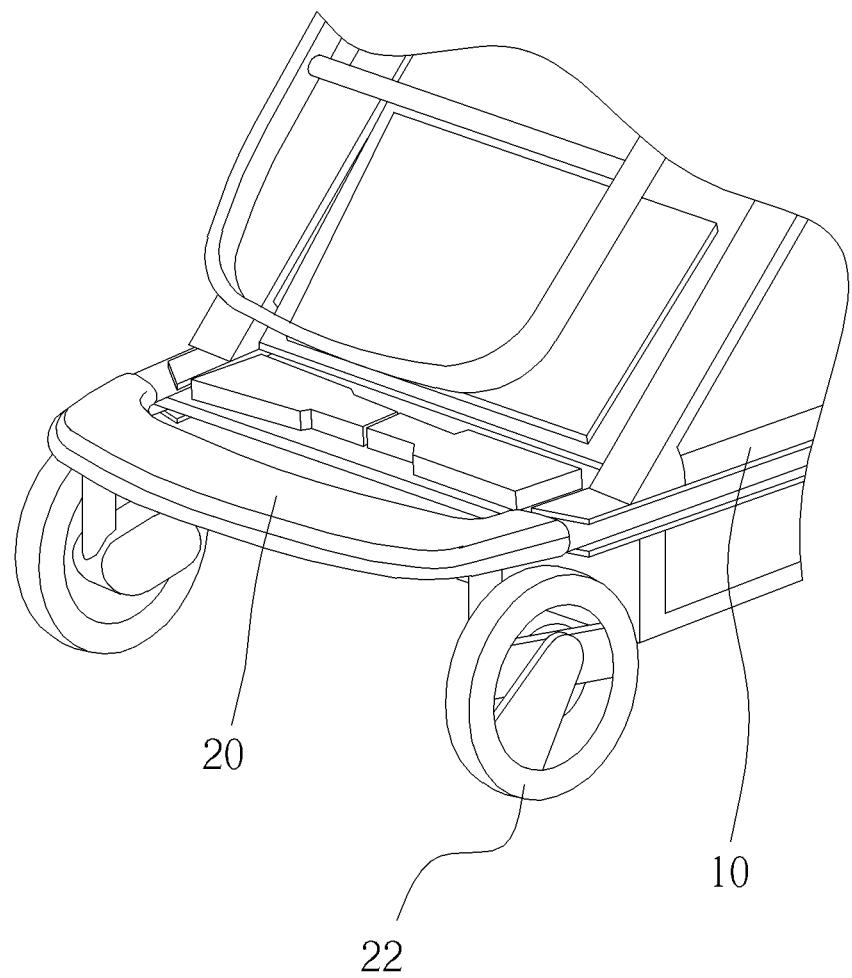
FIG. 3 is a schematic diagram showing a partial view of the child stroller with a second base retracted to a first base.
Figure 4:
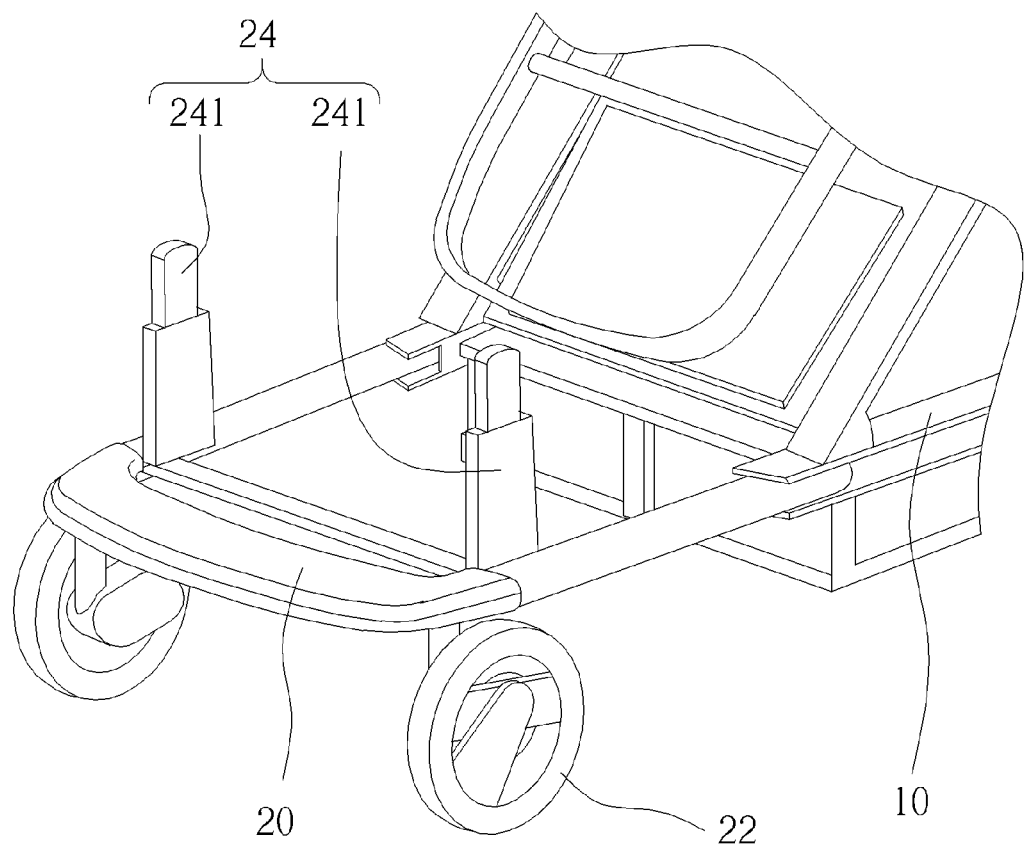
FIG. 4 is a schematic diagram showing a partial view of the child stroller with the second base extended from the first base.

Please refer to FIG. 3 and FIG. 4. FIG. 3 is a schematic diagram showing a partial view of the child stroller with a second base retracted to a first base and FIG. 4 is a schematic diagram showing a partial view of the child stroller with the second base extended from the first base. As previously described, the child stroller 100 provided in the invention can be slid open to create more space for accommodation. In FIG. 3, the second base 20 is retracted to a retracted position relative to the first base 10 and the child stroller 100 can be simply configured at such status as a single stroller. The second base 20 may be extended to an extended position relative to the first base 10 as shown in FIG. 4.

Figure 5:
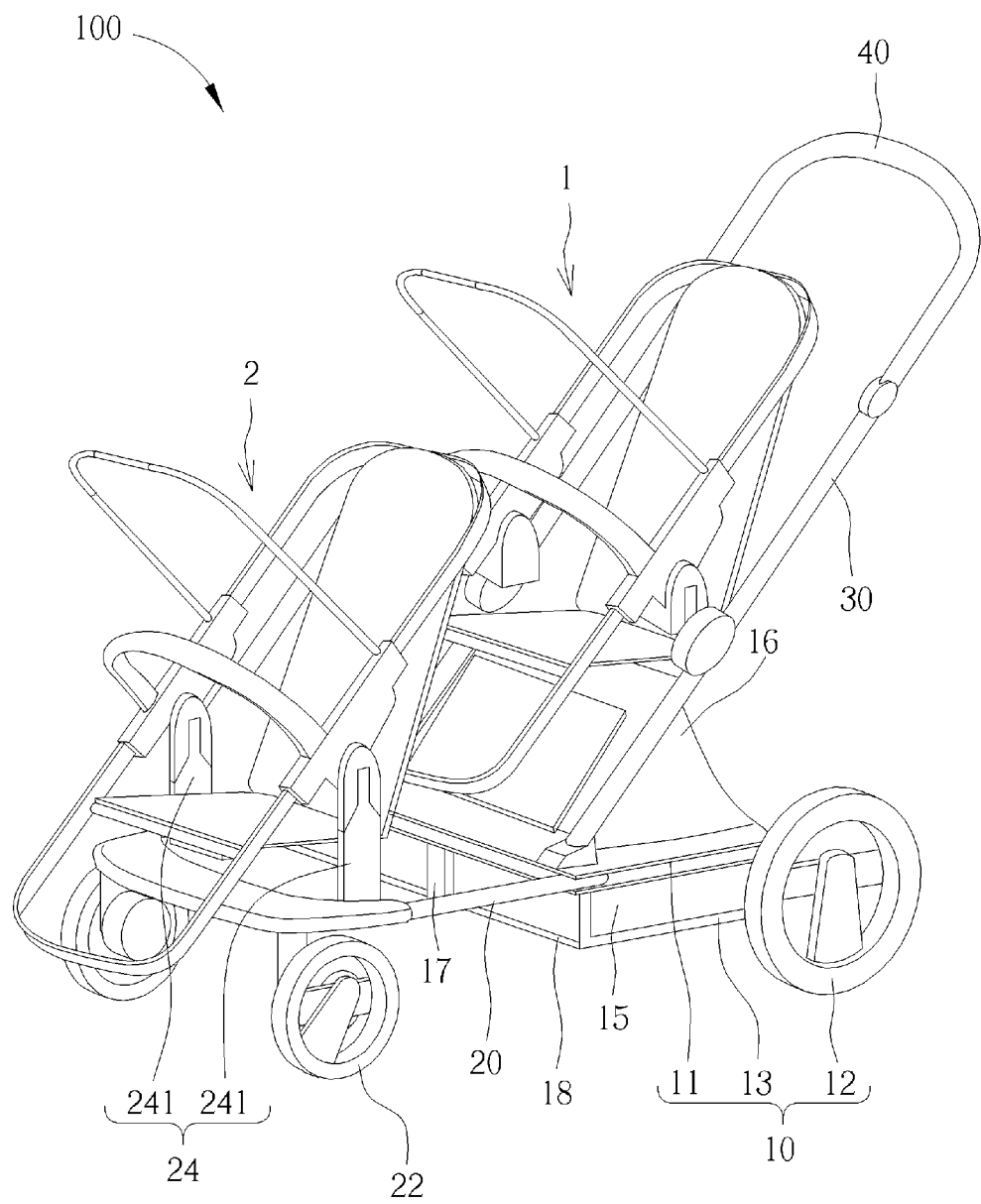
FIG. 5 is a schematic diagram showing a perspective view of the child stroller in another using status according to the embodiment of the invention.
Figure 6:
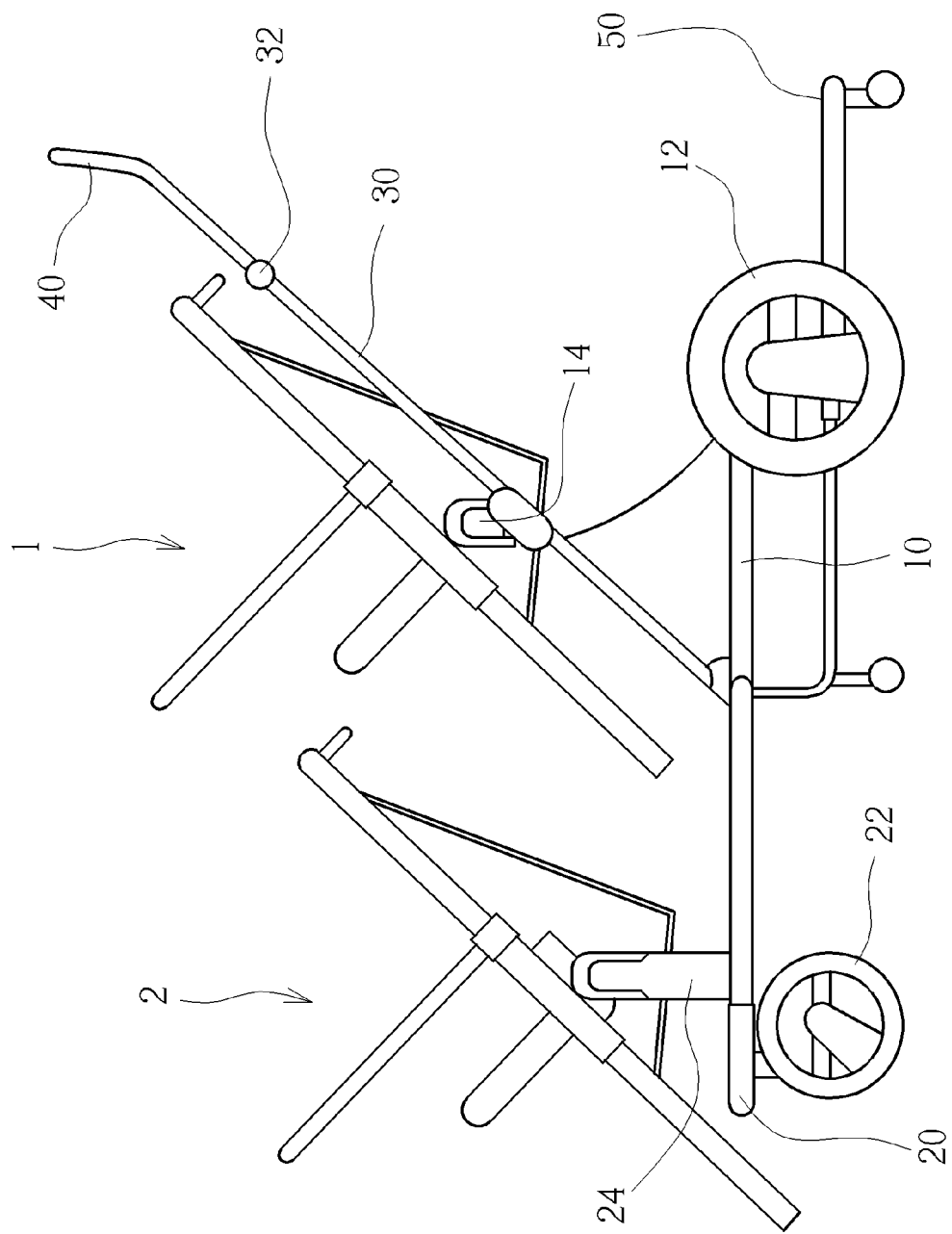
FIG. 6 is a schematic diagram of a side view of the child stroller in FIG. 5.

Please refer to FIG. 4, FIG. 5, and FIG. 6. FIG. 5 is a schematic diagram showing a perspective view of the child stroller in another using status according to the embodiment of the invention and FIG. 6 is a schematic diagram of a side view of the child stroller in FIG. 5. The second base 20 includes a second coupling unit 24, which has two second coupling components 241 at both sides of the second base 20 respectively, rotatable with respect to the first base 10. More specifically, the second base 20 in this embodiment is a U-shape frame where the two second coupling components 241 of the second coupling unit 24 are respectively pivoted to both sides of the U-shape frame. When the second base 20 is configured to the retracted position as shown in FIG. 3, the second coupling unit 24 is rotated to a folded position with respect to the first base 10. When the second base 20 is configured at the extended position, the second coupling unit 24 may be rotated to a front use position as shown in FIG. 4 and a second seat 2 can be mounted on the second base 20, or more specifically, coupled with the two second coupling components 241 of the second coupling unit 24 as shown in FIG. 5 and FIG. 6 and the child stroller 100 can be transformed into a dual stroller.

It should be noted that for the embodiments of child stroller 100 in the invention, the first coupling unit 14 and the second coupling unit 24 may be implemented as universal attachment and can accommodate a child seat, an infant carrier, or a bassinet as needed. In other words, the first seat 1 may be one of the child seat, infant carrier, and bassinet for supporting a child, and the second seat 2 may also be one of the child seat, infant carrier, and bassinet for supporting another child. Hence, the child stroller 100 of the invention gives the stroller the capacity of having multiple configurations.

Figure 7:
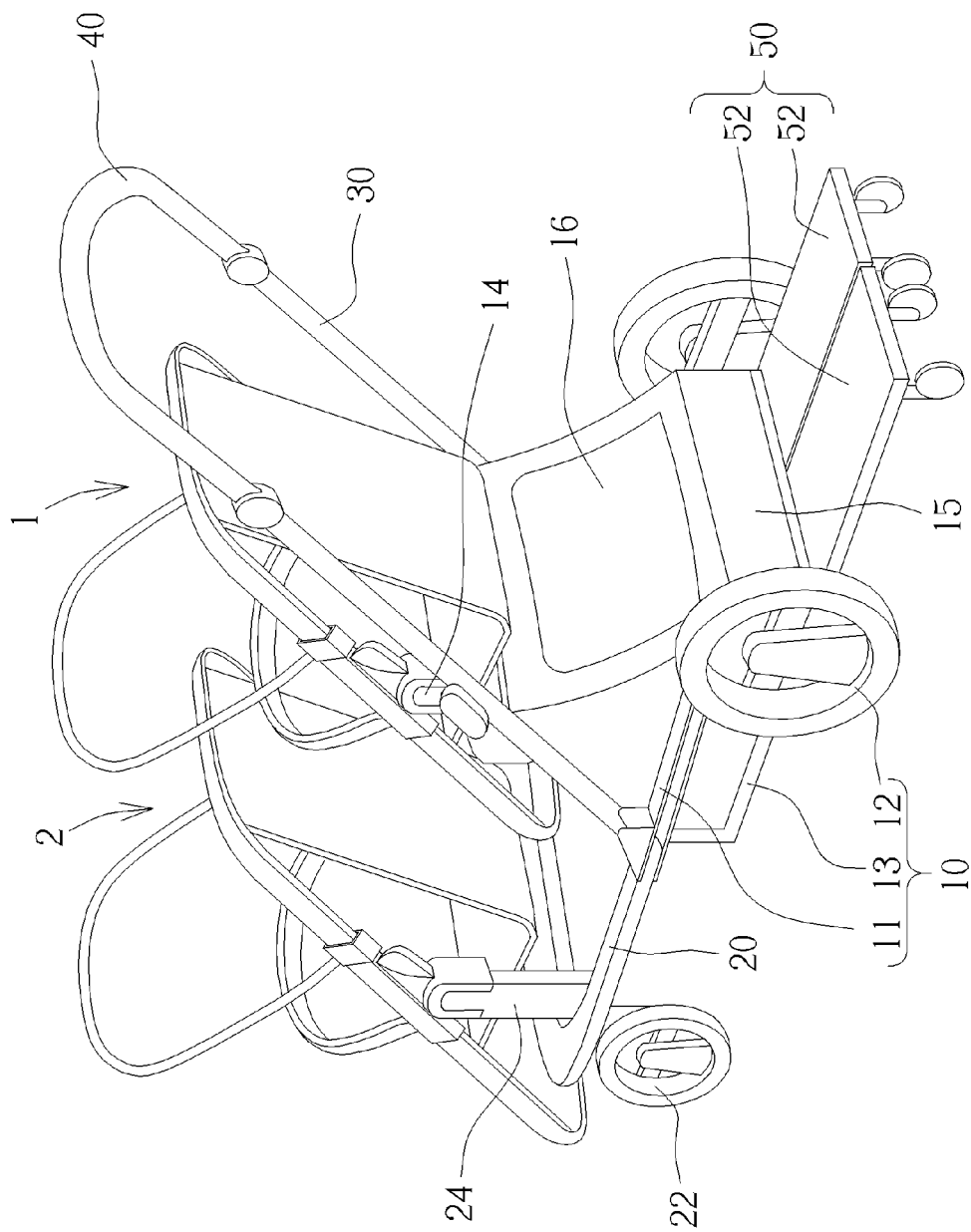
FIG. 7 is a schematic diagram of a rear perspective view of the child stroller in FIG. 5.
Figure 8:
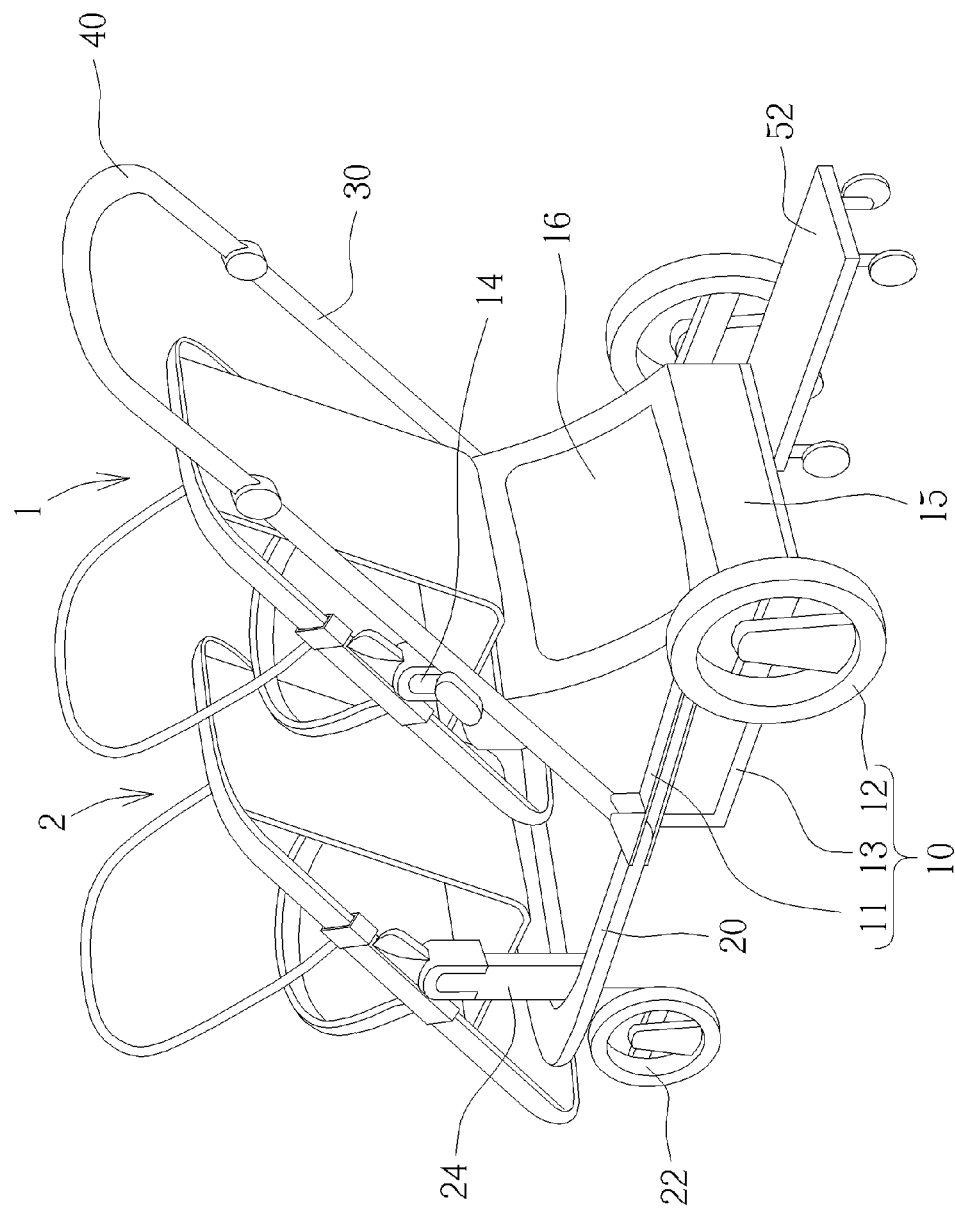
FIG. 8 is a schematic diagram of a rear perspective view of the child stroller in FIG. 5 with still another using status.

Please refer to FIG. 7 and FIG. 8. FIG. 7 is a schematic diagram of a rear perspective view of the child stroller in FIG. 5. FIG. 8 is a schematic diagram of a rear perspective view of the child stroller in FIG. 5 with still another using status. The child stroller 100 further includes slide out standing board set 50 that can be used for one foot or two feet. As shown in FIG. 7, the standing board set 50 has two standing boards 52, each separately slidably assembled with the first base 10. More specifically, in the embodiments of the invention, the standing board set 50 is slidably assembled with the first base 10 along a direction opposite to the second base 20, and both the second base 20 and the standing board set 50 are horizontally slidable with respect to the first base 10. The standing board set 50 can be retracted to a folded position relative to the first base 10 as shown in FIG. 1 and FIG. 2, which is configured hidden underneath the first base 10 and is invisible in the figures. The standing board set 50, either one or both the standing boards 52, can be extended to a rear use position relative to the first base 10 as shown in FIG. 6-9 to support still another child. A third child can stand on the standing board set 50 and also the caregiver may use the standing board 52 for one foot.

Please refer to FIG. 5, FIG. 7, and FIG. 8. In the embodiment as shown in the figures, the first base 10 uses a first track 11 and a second track 13 to cooperate with the second base 20 and the standing board set 50. The second base 20 is made slidable in the first track 11 to the extended position or to the retracted position as described previously. The second track 13 in this embodiment takes the shape of an L-type frame and is mounted at the bottom of the first track 11. The space created between the first track 11 and the second track 13 can be further utilized as a first storage room 15, with addition of fabrics around the first track 11 and the second track 13. Also the space above the first track 11, between the first track 11 and the first frame 30, can also be utilized as a second storage room 16.

It should be noted that the figures show only one side of the child stroller 100, and there are corresponding first track 11 and second track 13 at the other side of the child stroller 100. A cross support 18 interconnects the second tracks 13 at both sides, with a vertical support 17 supporting the bottom of the first track 11 on the cross support 18.

The standing board set 50, or the standing boards 52, are slidably assembled with the second track 13 and contained underneath the first base 10 when configured at the folded position as shown in FIG. 1 and FIG. 2, which provides the standing boards 52 with longer length, i.e., larger area, for the third child to have roomy space to stand thereon. To put it more specifically, the two standing boards 52 align with each other, each slidably assembled with the corresponding second track 13 along the length direction. In another embodiment, which is not provided with illustration, the standing board set 50 may have just one standing board 52, with its two sides slidably assembled with the corresponding second tracks 13 along the length direction. In still another embodiment, which is also not provided with illustration, the first base 10 may further include a third track interconnecting the cross support 18 and located between the two standing boards 52, each standing board 52 slidably assembled to the third track and corresponding second track 13.

Figure 9:
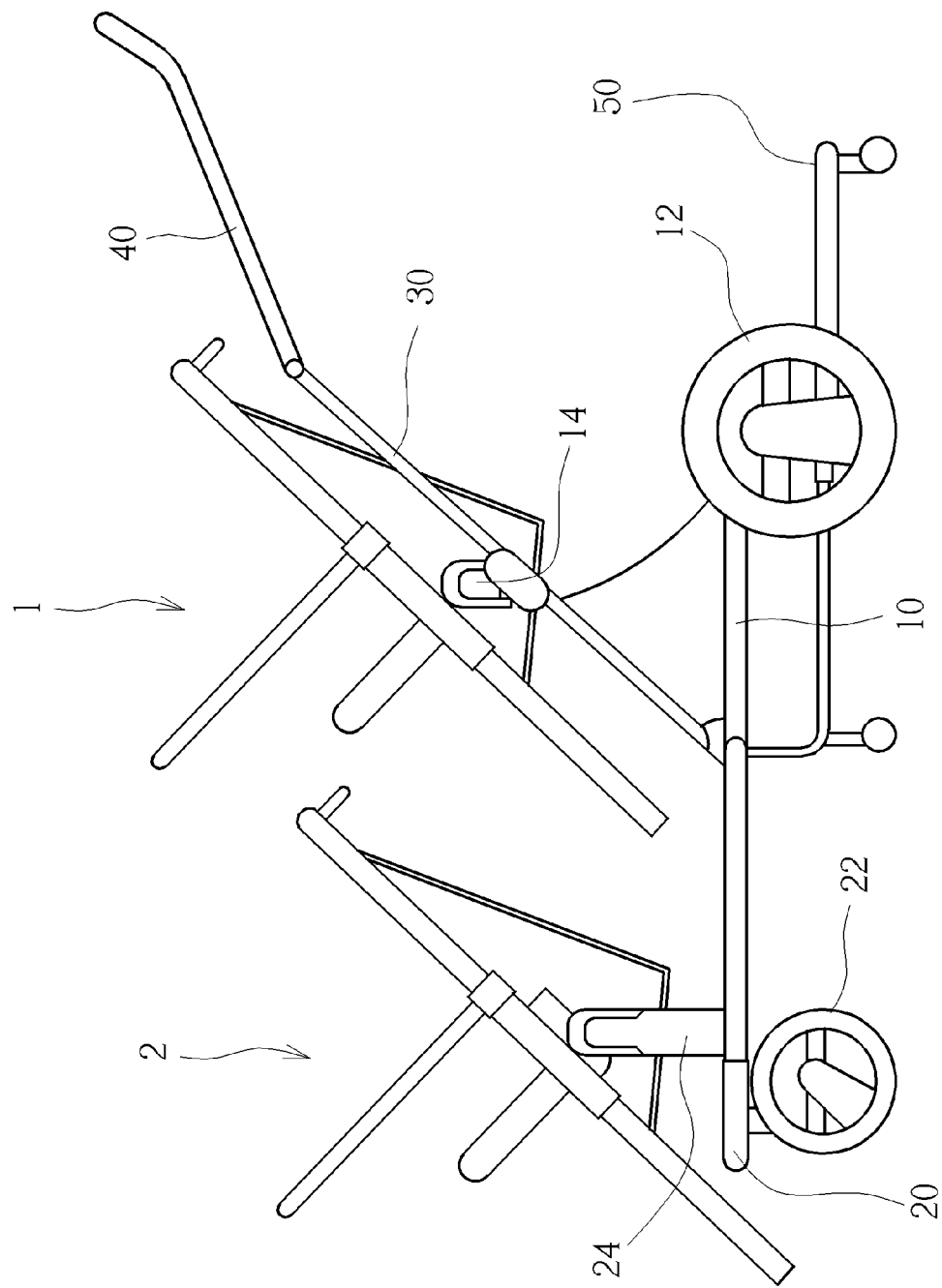
FIG. 9 is a schematic diagram of a side view of the child stroller in FIG. 5 with the handle configured to a pivoted position.

Please refer to FIG. 9. FIG. 9 is a schematic diagram of a side view of the child stroller in FIG. 5 with the handle configured to a rotated position. When the third child is on the standing board set 50, the handle 40 in its straight position, or a first position as shown in FIG. 6 for example, is difficult to reach for the caregiver and the handle 40 is in the third child's chest or face. Hence, the handle 40 may be configured from the first position to a second position shown in FIG. 9, where the handle 40 is rotated to have an included angle with the first frame 30 and the handle 40 provides a loop around the third child standing on the standing board set 50 at the rear use position. Also at the second position, the handle 40 extends farther horizontally toward the caregiver than the standing board set 50 at the rear use position, making it more comfortable for the caregiver to get a grip on and adds a bar on both sides of the standing child for stability.

The invention provides a child stroller that can grow with the family. The child stroller starts as a single stroller when the second base and the standing boards are fully folded toward the first base. The second base can be slid open with respect to the first base to create a space to attach a full-sized second child seat via the second coupling unit. The standing boards may be extended out from the first base at the back that can be used for one foot or both feet, so that a third child can stand on the standing boards. Multiple configurations are provided for the child stroller.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child stroller, comprising:
a first base comprising a first frame and a first wheel set;
a second base slidably assembled with the first base, the second base extendable to an extended position relative to the first base and retractable to a retracted position relative to the first base, the second base comprising a second wheel set;
a first seat detachably mounted on the first frame for supporting a child;
a second seat detachably mounted on the second base for supporting another child when the second base is configured at the extended position relative to the first base; and
a standing board set with its two sides slidably assembled with the first base along a direction opposite to the second base and is retractable relative to the first base to a folded position hidden underneath the first base;
wherein the first wheel set cooperates with the second wheel set and the child stroller is pushed around via both the first wheel set and the second wheel set.

2. The child stroller of claim 1, wherein the standing board set is extendable to a rear use position relative to the first base, the standing board set supporting still another child when configured at the rear use position.

3. The child stroller of claim 2, wherein the standing board set comprises two standing boards separately slidably assembled with the first base.

4. The child stroller of claim 2, wherein the second base and the standing board set are horizontally slidable with respect to the first base.

5. The child stroller of claim 1, further comprising a handle pivoted to the first frame and configurable between a first position and a second position.

6. The child stroller of claim 5, wherein the handle provides a loop around still another child standing on a standing board set when the handle is configured at the second position.

7. The child stroller of claim 1, wherein the first frame comprises a first coupling unit for coupling with the first seat and the second base comprises a second coupling unit for coupling with the second seat.

8. The child stroller of claim 7, wherein the second coupling unit is rotatable with respect to the first base to a folded position when the second base is configured to the retracted position.

9. The child stroller of claim 1, wherein the first seat and the second seat are ones of the child seats, infant carriers, and bassinets.

10. The child stroller of claim 1, wherein the first base further comprises a first track and the second base is slidably assembled with the first track of the first base.

11. The child stroller of claim 10, wherein the first base further comprises a second track mounted at the bottom of the first track and the standing board set are slidably assembled with the second track.

* * * * *